Feb. 20, 1968 TOHCHUNG WEI 3,369,691
STACKED FOOD CONTAINERS
Filed Dec. 15, 1966 3 Sheets-Sheet 1
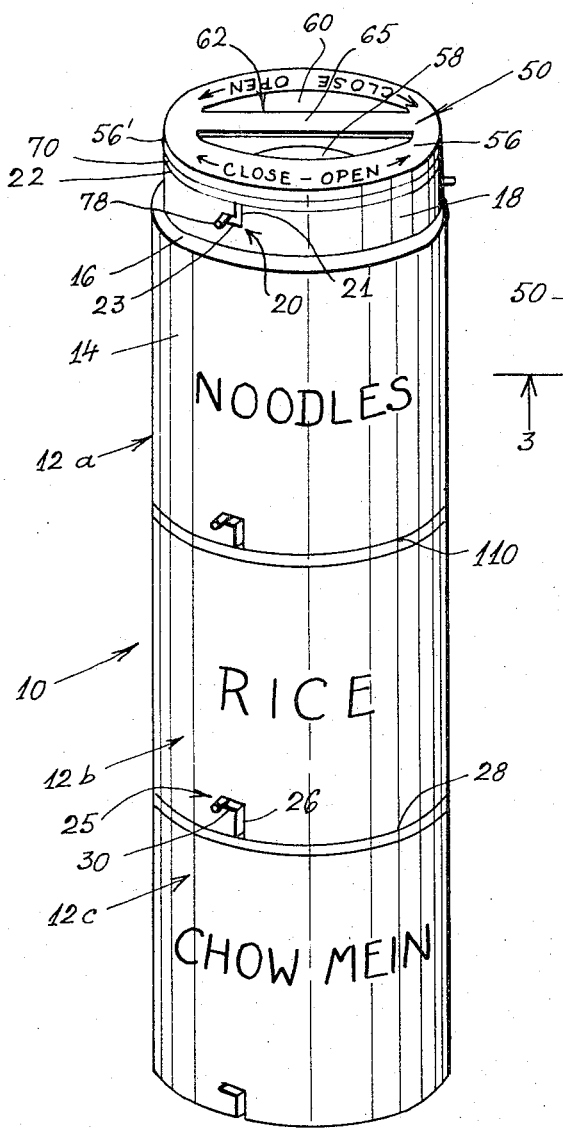
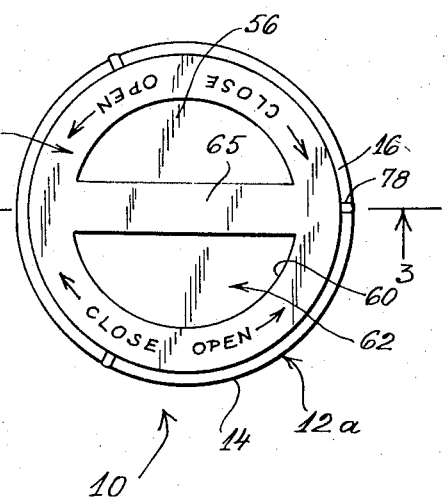
INVENTOR
*Tohchung Wei*
BY *Polachek & Saulsbury*
ATTORNEYS

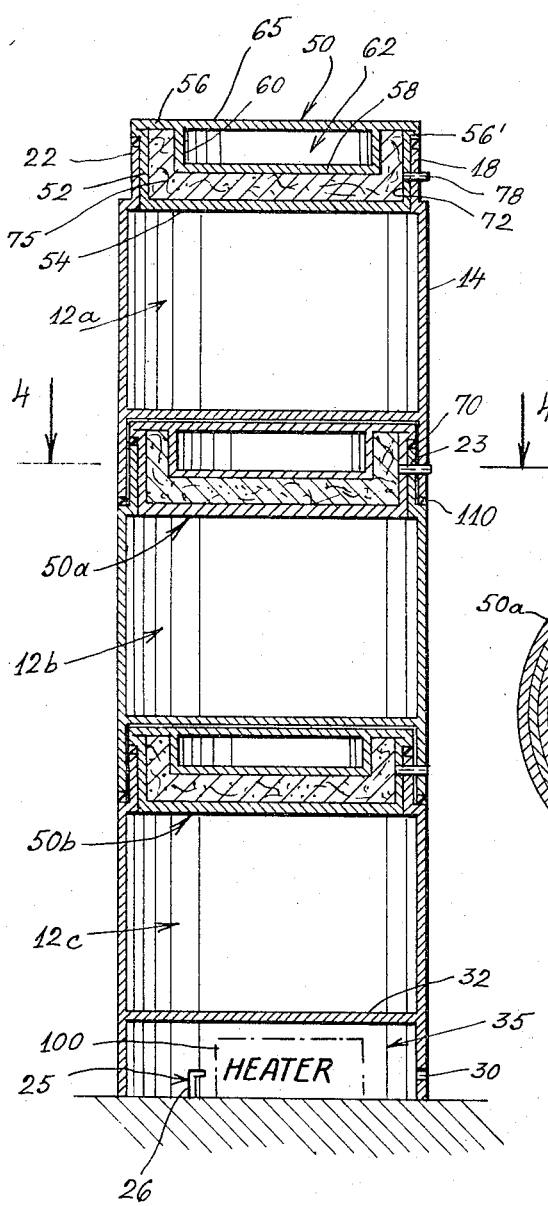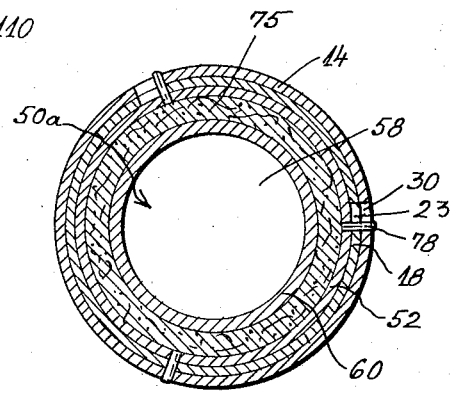

Feb. 20, 1968    TOHCHUNG WEI    3,369,691
STACKED FOOD CONTAINERS
Filed Dec. 15, 1966    3 Sheets-Sheet 3
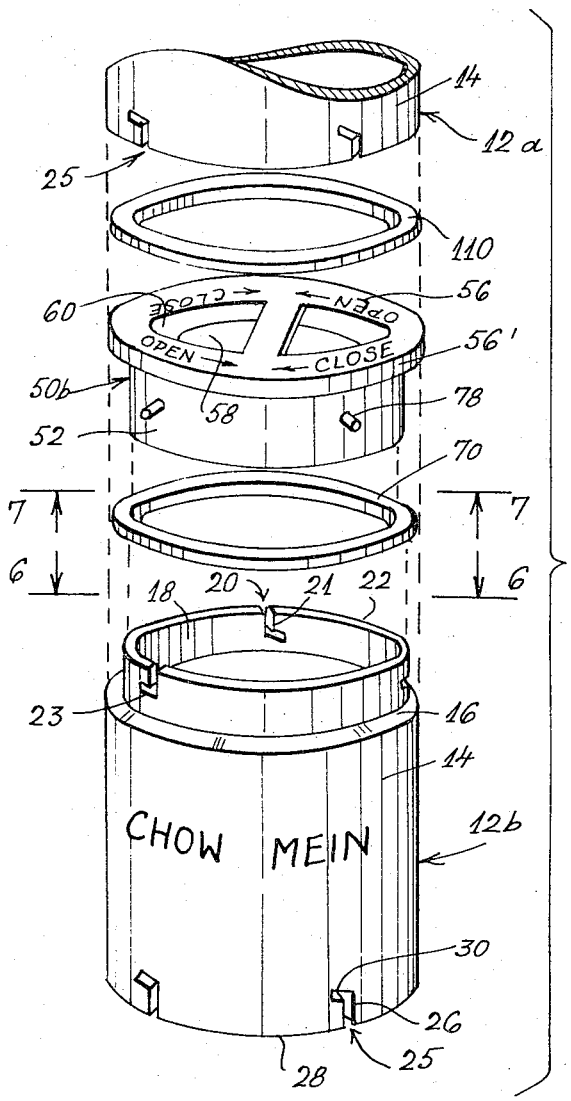
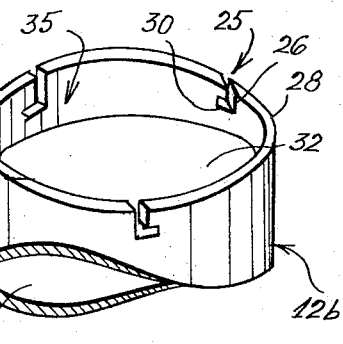
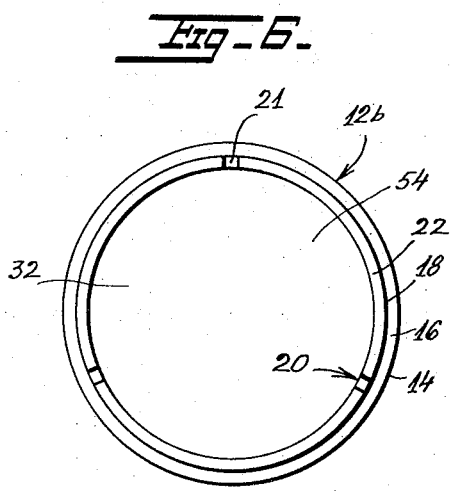
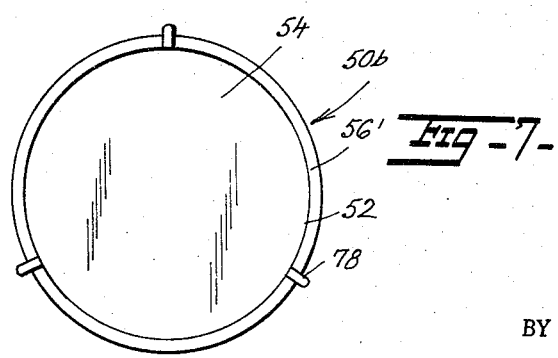
INVENTOR
Tohchung Wei
BY Polachek & Saulsbury
ATTORNEYS 3,369,691
STACKED FOOD CONTAINERS
Tohchung Wei, 169 E. Broadway,
New York, N.Y. 10002
Filed Dec. 15, 1966, Ser. No. 602,040
10 Claims. (Cl. 220—4)

ABSTRACT OF THE DISCLOSURE

This disclosure describes an assembly of stacked cylindrical containers, with a flat insulated cover or stopper for each container. The stoppers of the containers serve to hold the containers together and also are used to carry the containers.

---

This invention relates to the art of food containers and more particularly concerns containers having means for stacking and holding containers together and for sealing each container.

The invention is an improvement over the container assemblies described in my prior Patents 3,273,739 and 3,281,006. In my prior patents I have disclosed assemblies of containers in which a single cover is provided on top of a group of interconnected containers. When the containers are separated from each other, only one container has a cover and the others are uncovered. This is undesirable. The present invention provides a construction wherein each container of a stack thereof has its own cover. The cover is detachably engaged with its container and is provided with a flush handle bar so that the container can be carried by grasping the handle bar. Furthermore the cover of one container can serve to engage another container so that two containers are held together in axial alignment. The cover of the uppermost container has an exposed handle bar so that the stack of containers can be carried as a unit by grasping the exposed handle bar. Two or more containers can be similarly connected and carried together.

It is therefore a principal object to provide a container assembly in which two or more cylindrical containers are held together in axial alignment by individual covers of the several containers.

A further object is to provide a container assembly as described, wherein each cover is cylindrical and has a handle bar flush or coplanar with the top of the cover.

Still another object is to provide a container assembly as described, wherein each cover is provided with radially extending pins which engage in bayonet slots of adjacent containers.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is an oblique side and top view of a stack of containers embodying the invention.

FIG. 2 is a top plan view of the stack of containers.

FIG. 3 is a vertical sectional view taken on line 3—3 of FIG. 2.

FIG. 4 is a horizontal cross sectional view taken on line 4—4 of FIG. 3.

FIG. 5 is an exploded perspective view of parts of the stack of containers.

FIG. 6 and FIG. 7 are top and bottom plan views taken on lines 6—6 and 7—7 respectively of FIG. 5, and FIG. 8 is a fragmentary perspective view of a container in an inverted position.

Referring to the drawing, there is shown a stack 10 of containers 12a, 12b and 12c. The containers have identical construction. Each container has a cylindrical outer wall 14 and a narrow annular radially inwardly extending ledge 16. A cylindrical flange 18 extends axially upwardly from the inner edge of the ledge 16. In the flange are three bayonet slots 20. Each slot has an axially extending vertical portion 21 extending downwardly from the upper edge 22 of the flange; see FIG. 5. A short slot portion 23 extends circumferentially and horizontally from the lower end of slot portion 21. The three slots are spaced apart about 120° equally circumferentially of the container. Three other bayonet slots 25 are formed at the bottom of the container. Each slot has vertical portion 26 extending axially of the container upwardly from the bottom edge 28. A short slot portion 30 extends circumferentially and horizontally from the upper end of slot portion 26. The straight vertical slot portions 26 of slots 25 are all aligned with the straight vertical slot portions 21 of slots 20. Each container has a closed circular bottom 32 spaced from the bottom edge of the container to define a chamber 35; see FIGS. 3 and 8.

Each container is provided with a cover 50, 50a, 50b. The covers are all identical in construction. Each cover has cylindrical outer wall 52 closed at the bottom by a circular wall 54. At the top the cover is closed by a wall which has a flat annular portion 56 and an inner circular portion 58 connected by a cylindrical inner wall portion 60. A recess 62 is thus defined by wall portions 58 and 60. The recess is open at the top. A flat handle bar 65 extends diametrally across the recess and is connected at opposite ends by welding or otherwise to diametrically opposite points of wall portion 56. The stiff bar 65 serves as a handle for lifting, carrying and manipulating the cover. The upper wall portion 56 extends radially outward beyond wall 52 to define a radial flange 56'. Flange 56' is equal in outer diameter with the upper edge 22 of flange 18 of each container in which the cover is seated. A resilient gasket or gasket ring 70 can be interposed between the flange 56' and edge 22. A cavity 72 is defined between the walls of the cover. This cavity is filled with a suitable thermal insulation packing 75.

Three pins 78 extend radially outward from 54. The pins are spaced equally about 120° apart so that they fit readily into the bayonet slots 20 and 25. It will be noted that the short horizontal slot portions 23 and 30 all extend in the same direction away from the straight vertical slot portions 21 and 26, i.e. clockwise as viewed in FIGS. 1 and 5. By the arrangement described, any cover can be inserted axially into the open top of any container with flange 56' abutting the upper edge 22 of container flange 18. Gasket 70 will be interposed between the flanges 18, 56'. Thus the container will be sealed. When the cover is inserted into the container the pins 78 will line up with slot portions 21 and the cover will be pushed down axially. Then on reaching the bottom ends of the slot portions 21 the cover will be turned clockwise with respect to container to lock the cover in the container.

Pins 78 will extend outwardly of flange 18. Any other container can then be mounted on top of the covered container by lining up slot portions 26 with the pins 78 and then fitting the other container on the covered container. When the other container is pushed down until the upper ends of slot portions 26 are at the pins, the other container can be turned clockwise with respect to the lower container to lock the two containers together as the pins enter the short portions 30 of slots 25. Disengagement of covers and containers is accomplished by reverse movements.

It will be apparent that a stack of containers can be carried by grasping the exposed handle bar of the upper container. Two or more containers can be similarly joined together. Each container has its own cover. A heater 100 of any type such as one having canned fuel can be inserted into chamber 35 as shown by dotted lines in FIG. 3. The containers can be disengaged and each container in turn can be placed on top of the heater. Slots 25 in the container admits air to chamber 35 to sustain combustion in this chamber.

The flush flat construction of handle bar 65 permits it to lay close to or against the bottom 32 of the upper container. By this construction the flange 18 and cover 50a or 50b of each lower container fit snugly into the chamber 35 of the upper container 50a or 50 as shown in FIG. 3. This results in a compact arrangement. The resilient gaskets 70 serve to seal the upper ends of the containers. They also cooperate with the cover in maintaining a tight frictional fit in the bayonet slots 20 so that the cover cannot accidentally work loose. If desired additional gaskets or gasket rings 110 can be interposed between the bottom edges 28 of the upper containers and the ledges 16 of the lower containers. These gasket rings will help to maintain engagement of the upper containers with the pins 78 of the cover of the lower containers. Also rings 110 will cooperate with rings 70 to effect a complete seal of the top of each lower container.

As many containers as desired can be connected together. No cover can be inadvertently omitted from any lower container since then it will not be possible to connect the upper container thereto. This is an important safety feature of the invention. The covers serve the multiple purposes of sealing the containers connecting the containers, and acting as carrying or support means. The containers can be made of metal, plastic, paper, composition material or any suitable sheet material.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A container assembly comprising a cylindrical container having a first cylindrical wall, said cylindrical wall having a narrow radially inwardly extending annular ledge formed near one end thereof, said cylindrical wall having an axially extending cylindrical flange extending upwardly from the inner edge of said ledge, said flange having first engagement means for engaging a cover; and a cover for said container, said cover having a cylindrical outer second wall snugly fitting into said flange in axial alignment therewith, said cover having a top wall formed with a flat annular, outer section, a circular inner section, and a cylindrical axially extending section connecting the annular end circular sections to define a recess open at the top, a flat handle bar coplanar with said flat section of the top wall and connected at opposite ends to spaced points thereof to serve as a carrying handle and to facilitate inserting the cover into the container and removing the cover from the container, and second engagement means on the cover detachably engaged with the first engagement means of the container and engageable with other engagement means of another cyclindrical container while said other container seats on said ledge.

2. A container assembly as recited in claim 1, wherein said first engagement means is a plurality of bayonet slots spaced apart circumferentially of the first container, and the second engagement means on the cover is a plurality of radially extending pins engageable in said slots respectively and extending axially out of the slots for engaging the other containers.

3. A container assembly as recited in claim 2, wherein the top wall of the cover extends radially outwardly of said second cylindrical wall to define an annular flange overlaying the outer free end of said cylindrical flange, and a resilient gasket interposed between the annular flange and the free end of the cylindrical flange to seal the cover to the first container and to keep the pins frictionally engaged with the bayonet slots.

4. A container assembly as recited in claim 1, further comprising third further engagement means at the other end of said first cylindrical wall for detachably engaging with another cover of a third container.

5. A container assembly as recited in claim 1, further comprising a second cylindrical container having a third cylindrical wall axially aligned; with the first cylindrical wall and having one end seated on said ledge, and third engagement means at the one end of said third wall detachably engaged with said second engagement means so that the first and second containers are disengageably held together by said cover.

6. A container assembly as recited in claim 5, wherein the first and third engagement means are two sets of registering bayonet slots spaced apart circumferentially of the first and third cylindrical walls respectively, and the second engagement means on the cover is a plurality of radially pins spaced apart circumferentially to said second cylindrical wall and engaged in the registering bayonet slots of the first and second containers.

7. A container assembly as recited in claim 6, wherein the top wall of the cover extends radially outwardly of said second cylindrical wall to define an annular flange overlaying the outer free end of said cylindrical flange, and a resilient gasket interposed between the annular flange and the free end of the cylindrical flange to seal the cover to the first container and to keep the pins frictionally engaged in the bayonet slots in the first cylindrical wall.

8. A container assembly as recited in claim 7, further comprising another resilient gasket interposed between the one end of said third cylindrical wall and said ledge to keep the bayonet slots frictionally engaged in the bayonet slots in the third cylindrical wall.

9. A container assembly as recited in claim 1, wherein said cover has a bottom wall spaced from said top wall and secured to said second cylindical wall to define a chamber therewith, and a packing of thermal insulation material in said chamber to insulate the cover.

10. A container assembly as recited in claim 5, wherein said third cylindrical wall has a narrow radially inwardly extending other annular ledge for seating one end of a third cylindrical container thereon, said third cylindrical wall having another cylindrical flange extending axially upwardly from said other ledge for receiving another cylindrical cover, fourth engagement means on said other flange; and a second cover for said second container, said second cover having a cylindrical outer fourth wall snugly fitted in said other flange, said second cover having another top wall formed with another flat annular outer section and another circular inner section, and another cylindrically extending section connecting the other annular and circular sections to define another recess open at the top, another flat handle bar coplanar with the other flat section of the other top wall and connected at opposite ends to spaced points thereof to serve as a carrying handle for both the first and second containers, and fifth engagement means on the second cover engaged with the fourth engagement means of the second container and engageable with a further cylindrical container while said further container seats on said other ledge.

References Cited

UNITED STATES PATENTS

| 1,362,933 | 12/1920 | Ferdon | 220—8 |
| 1,516,775 | 11/1924 | McCarron | 220—97 |
| 2,320,647 | 6/1943 | Phillips. | |
| 2,326,414 | 8/1943 | Thompson | 220—97 XR |
| 3,273,739 | 9/1966 | Wei | 220—4 |

FOREIGN PATENTS

| 225,167 | 4/1943 | Switzerland. |
| 187,001 | 10/1956 | Austria. |

THERON E. CONDON, *Primary Examiner.*

G. E. LOWRANCE, *Assistant Examiner.*